United States Patent [19]

Ingram et al.

[11] 3,843,211
[45] Oct. 22, 1974

[54] ANTI-SKID HYDRAULIC BRAKING SYSTEMS

[75] Inventors: Brian Ingram, Balsall Common; David Anthony Harries, Solihull; Lancelot Phoenix, Birmingham, all of England

[73] Assignee: Girling Limited, Birmingham, England

[22] Filed: Mar. 14, 1973

[21] Appl. No.: 340,949

Related U.S. Application Data

[62] Division of Ser. No. 105,356, Jan. 11, 1971, Pat. No. 3,738,387.

[30] Foreign Application Priority Data
Feb. 28, 1970 Great Britain............... 9769/70
Mar. 18, 1970 Great Britain............... 13116/70

[52] U.S. Cl............................. 303/21 F, 188/181 A
[51] Int. Cl............................................... B60t 8/06
[58] Field of Search............ 303/21 F, 61–63, 303/68–69; 188/181; 137/625.65; 251/129; 138/44

[56] References Cited
UNITED STATES PATENTS

| | | | |
|---|---|---|---|
| 2,557,514 | 6/1951 | Ray | 251/129 |
| 2,764,891 | 10/1956 | McGowen | 138/44 |
| 3,667,816 | 6/1972 | Harned | 303/21 F |
| 3,694,038 | 9/1972 | Ingram et al. | 303/21 F |

Primary Examiner—Trygve M. Blix
Assistant Examiner—D. C. Butler
Attorney, Agent, or Firm—Imirie, Smiley & Linn

[57] ABSTRACT

An anti-skid hydraulic braking system in which a control valve is solenoid operated in response to excessive braking pressure to relieve such braking pressure and prevent skidding. A spring loaded push rod assembly urges a valve member into engagement with a seating in a housing and is coupled to the solenoid armature by a lost-motion connection to preclude valve damage. A flow restrictor is also provided in a return port of the housing to delay the reapplication of the brake on deactivation of the control valve so that the braking pressure does not increase sharply.

5 Claims, 1 Drawing Figure

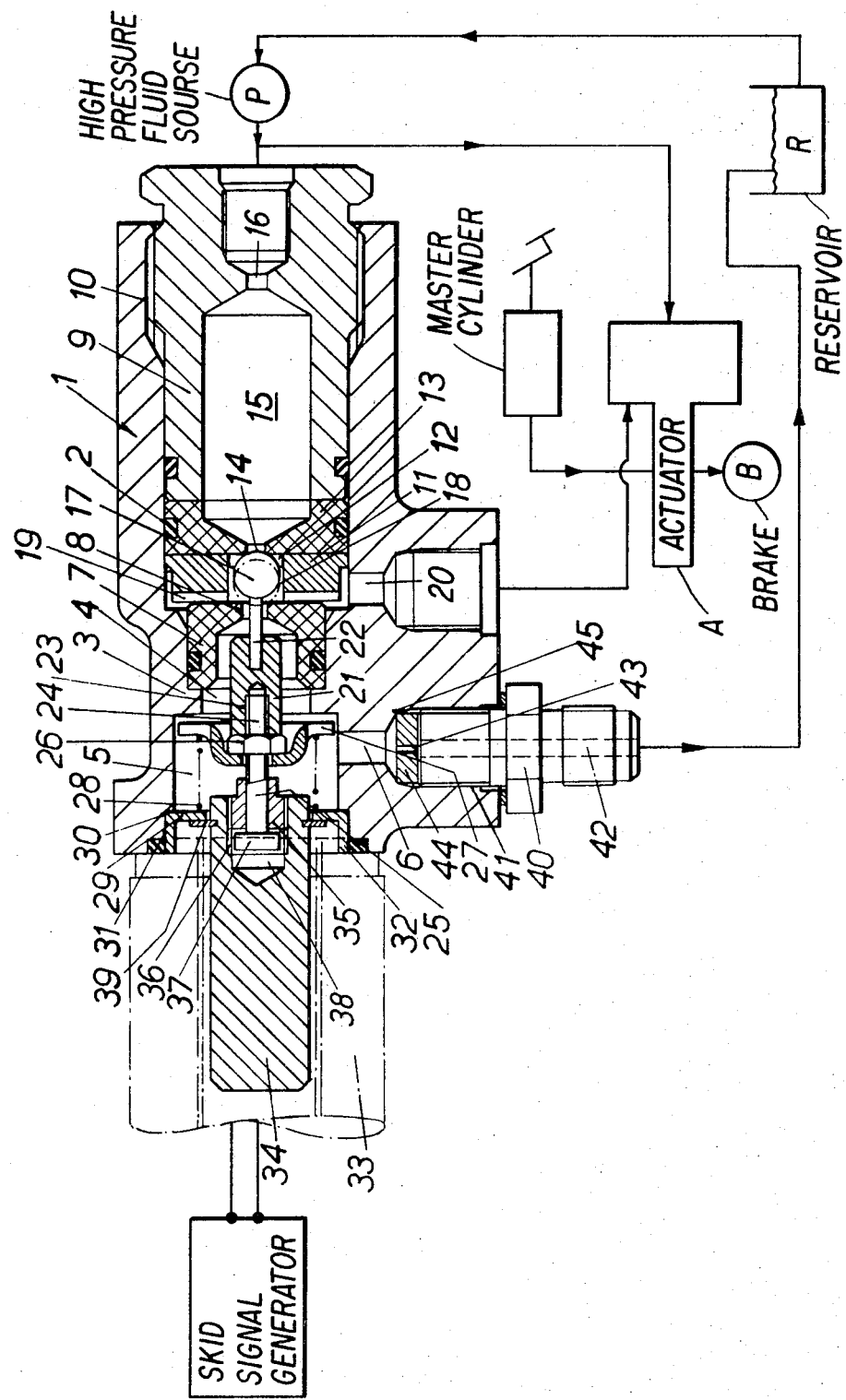

ANTI-SKID HYDRAULIC BRAKING SYSTEMS

This is a division of application Ser. No. 105,356, filed Jan. 11, 1971, now U.S. Pat. No. 3,738,387.

This invention relates to anti-skid hydraulic braking systems including an improved control valve for use in controlling the flow of fluid through a seating in a housing of the kind in which a valve member is normally urged against the seating to cut off fluid flow by a pre-loaded spring acting on the valve member through a push-rod assembly, and the push-rod assembly is movable in an opposite direction away from the seating upon energization of a solenoid.

Hitherto in control valves of that kind the push-rod assembly is rigidly connected to the armature of the solenoid so that, when the solenoid is de-energized and the valve member is urged into engagement with the seating by the push-rod assembly, the closing force of the pre-loaded spring, which is applied to the valve member through the push-rod, is augmented by the inertia of the armature. In some constructions, particularly where the area of the valve seat is relatively small, the augmented closing force may be sufficiently large to cause the valve seat to become damaged by the engagement with it of the valve member.

According to our invention, in a control valve of the kind set forth the push-rod assembly is coupled to the armature of the solenoid by a lost-motion connection permitting movement of the armature relative to the push-rod assembly through a limited range, at least in a direction towards the seating, and movement of the armature in a direction towards the seating is resisted by a fixed abutment after the push-rod assembly has engaged with a stop limiting movement of the push-rod in a direction to urge the valve member into engagement with the seating and before the armature has moved relative to the push-rod through the said limited range.

Thus the inertia of the armature is taken by the fixed abutment and the closing force comprises the force in the preloaded spring and the inertia of the push-rod, which is small in comparison with that of the armature.

The stop limiting movement of the push-rod conveniently comprises the engagement between the valve member and the seating. Furthermore, a flow restrictor provided in a return port of the housing delays the re-application of the brake on deactivation of the control valve so that the braking pressure does not increase sharply following the completion of an anti-skid cycle.

The single FIGURE is a longitudinal sectional view of a control valve connected with an anti-skid braking system according to the present invention.

In the control valve illustrated 1 is a housing having a stepped cylindrical through-bore 2 of which portions of the bore are separated by a partition member 3 having a central opening 4. A chamber 5 defined in the bore between one face of the partition member 3 and one end of the housing is formed with a radial port 6 adapted to be connected to a return line to a reservoir for supplying fluid to a high pressure pump. The opposite face of the partition member 3 forms an abutment for the inner end of a cup-shaped sleeve 7 which is formed in its closed end with a central opening 8. The sleeve 7 is held in engagement with the partition member 3 by a plug 9. The plug 9 is screwed in a portion 10 of enlarged diameter at the opposite end of the bore 2.

A spacer member 11 having a central opening 12 of substantial diameter is clamped between the sleeve 7 and an adjacent face of an annular member 13 of which the opposite face is in abutment with the inner end of the plug 9. The annular member 13 is provided with a central opening 14 of a diameter substantially equal to or slightly smaller than that of the opening 8. The opening 14 is in communication with chamber 15 in the plug 9 adapted to be connected to a source of high pressure fluid, for example, the pump or an hydraulic accumulator supplied by the pump, through a connection 16.

A valve member in the form of a ball 17 is located in a chamber 18 disposed between the sleeve 7 and the annular member 13 and defined by the opening 12. The ball 17 is adapted to engage with one of a pair of axially spaced seatings surrounding the openings 8 and the chamber 18 is adapted to be connected to an actuator for controlling a wheel brake slave cylinder through a radial passage 19 in the member 11 and a communicating radial port 20 in the wall of the housing 1.

Normally the ball 17 is held against the seating surrounding the opening 14 to cut-off communication between the high pressure source and the actuator by a push-rod assembly located in the chamber 5.

The push-rod assembly comprises a cylindrical holder 21 from the inner end of which projects a stem 22 of reduced diameter which normally extends through the opening 8 and engages at its free end with the ball 17. A central axial recess 23 extending inwardly from the opposite end of the holder 21 receives, in screw-threaded engagement, the outer end of a threaded stem 24 of an axially extending actuating rod 25. A locking nut 26 screwed onto the stem 24 abuts against the adjacent end of the holder 21 to lock the stem 24 and the holder 21 against relative rotation. The face of the nut 26 remote from the holder 21 forms an abutment for a plate 27 of dished outline which in turn forms an abutment for one end of a pre-loaded spring 28. The outer opposite end of the spring 28 engages with an inwardly extending radial abutment flange 29 engaging with a shoulder 30 at the base of an annular recess 31 in the wall of the housing 1 at that end in which the chamber 5 is located. The flange 29 is integral with a ring 32 of an axial length equal to that of the recess 31. The outer end of the ring 32 is clamped in engagement with a casing 33 incorporating solenoid windings (not shown) which surround an armature 34.

The actuating rod 25 works through a central opening in a bushing 35 screwed into an axially extending recess 36 in the inner end of the armature 34. An enlarged head 37 carried by the inner end of the rod 25 is located in a chamber 38 defined between the inner end of the recess 36 and the bushing 35. The head 37 is of an axial length less than that of the chamber 38 and of a diameter less than that of the recess 36. The head 37 is this axially movable relative to the armature 34 to form a lost-motion connection between the armature 34 and the actuating rod 25.

An abutment ring 39 for engagement with the outer face of the flange 29 is carried by the armature 34 adjacent to its inner end.

In the position shown in the drawing in which the solenoid windings are de-energized the ring 39 engages with the flange 29 and the head 37 is spaced from the bushing 35. In that position the ball 17 is held against the seating 14 to cut-off communication between the chamber 15 and the ports 20 and 6 due to the influence of the spring 28.

When the solenoid windings are energized in response to a signal received from a control module sensing excessive deceleration of a braked wheel, the armature 34 is moved away from the housing 1 and, after the lost motion clearance between the head 37 and the bushing 35 has been taken-up, the armature withdraws the actuating rod 25 against the loading of the spring 28. This permits the ball 17 to move out of engagement with the seating 14 and engage the seating 8 due to the high pressure fluid supplied to the chamber 15 through the port 16. That movement of the ball 17 places the chamber 15 in communication with the port 20 so that fluid from the pressure source is supplied to the actuator.

When the solenoid windings are again de-energized, the pre-loaded spring 28 moves the actuating rod 25 in the opposite direction taking with it the armature 34 and the free end of the stem 22 acts on the ball 17 to urge it into engagement with the seating 14 which acts as a stop preventing further movement of the rod 25 in that direction. Due to the provision of the lost-motion connection any inertia applied to the armature 34 during this movement is not transferred to the actuating rod 25 but is taken by the flange 29 before relative movement between the head 37 and the armature 34 is sufficient to enable the head 37 to engage with the base of the recess 38.

When the control valve described above is incorporated in an hydraulic braking system, conveniently of the kind described in our U.S. Pat. No. 3,703,319, the connection 16 is connected to a source of high pressure fluid P, the radial port 6 is connected to a return line to a reservoir R for supplying fluid to the high pressure source through a union 40 screwed into a passage in the housing 1 and having an axial passage 42 in communication with the port 6, and the port 20 is connected to an actuator A for controlling the pressure of hydraulic fluid applied to at least one wheel brake B. Preferably the actuator is of the construction described in our U.S. Pat. No. 3,694,038. In normal operation of the hydraulic braking system the control valve is in the position shown in the drawings with the solenoid windings de-energized and the ball 17 held in engagement with the seating 14 to cut-off communication between the source of high pressure fluid and the actuator through the port 20. In that position fluid can return from the actuator to the reservoir through the ports 20 and 6 which are in communication by a flow path in the housing 1 defined by the chamber 5, the opening 4, the opening 8 in the sleeve 7, and the radial passage 19.

When the deceleration of the braked wheel exceeds a predetermined value the solenoid windings are energized and the armature 34 is withdrawn to permit the ball 17 to engage with the seating 8 as described above. Communication between the ports 20 and 6 is cut-off and high pressure fluid from the high pressure source is then supplied to the actuator to relieve the braking effort. Fluid within the chamber 5 and the opening 4 is then returned to the reservoir through the port 6 and the communicating passage 42.

In such a hydraulic braking system a restriction may be provided within the return line between the port 6 and the reservoir. The provision of the restriction reduces the rate at which hydraulic fluid is returned to the reservoir form the actuator through the flow path in the housing 1 between the ports 20 and 6, thereby controlling the rate of re-application of the wheel brake.

In one construction the restriction comprises an orifice formed in a plate which is located in the return line at any convenient location. As illustrated in the drawings the restriction comprises an orifice 43 provided in a plate 44 disposed between the inner end of the union 40 and a shoulder 45 at the inner end of the passage 41 into which the union 40 is screwed.

This has the advantage that, by unscrewing the union 40 from the passage 41, the orifice plate 44 can be removed and replaced by a plate provided with an orifice of a different diameter, whereby the characteristics of wheel brake re-application can be controlled in accordance with the requirements of any, or one particular, wheel brake of a particular vehicle. For example, if the orifice plate is replaced by a plate provided with an orifice of greater diameter the rate of re-application of the wheel brake is increased. Similarly if the orifice plate is replaced by a plate provided with an orifice of lesser diameter, the rate of re-application of the brake is decreased. The selection of a particular orifice plate will depend entirely upon the braking characteristics of a system in accordance with the requirements of a vehicle in which it is to be installed.

The plate 44 is of a minimum thickness consistent with enabling the plate to define an orifice 43 of a particular diameter. Thus the ratio of plate thickness to orifice diameter is maintained at a minimum value. At least the edge of the plate 44 which defined the end of the orifice 43 remote from the chamber 5 and facing the union 40 is of a sharp 90° outline.

The construction or orifice plate described above is of advantage in that its characteristics remain substantially constant irrespective of changes in the viscosity of the hydraulic fluid. For example the orifice operates satisfactory when the temperature of the hydraulic fluid is at low as −20°C.

We claim:

1. An anti-skid hydraulic braking system comprising means for supplying hydraulic fluid under pressure to at least one wheel brake, a hydraulically operated actuator for cutting off the supply of fluid to the brake and for modulating the braking pressure, a source of high pressure fluid for operating said actuator, a reservoir for supplying said source, a solenoid-operated control valve for selectively controlling fluid flow between said source and said actuator and between said actuator and said reservoir, and means for activating said control valve in the event of a skid to allow fluid from said source to operate said actuator and relieve the braking pressure, the arrangement being such that, when the control valve is deactivated, fluid returning from said actuator to said reservoir allows the braking pressure to increase, said control valve comprising a housing, a first seating in said housing between a first port connected to said source of high pressure fluid and a second port connected to said actuator, a valve member normally engaged with said first seating, a second valve seating in said housing spaced from said first valve seating, a solenoid, an armature for moving said valve member away from said first seating and towards said second seating upon energization of said solenoid, means defining a chamber between said first and second valve seatings, a third port in said housing connected to said reservoir and in communication with said chamber through said second valve seating, and a flow restrictor in said control valve between said chamber and said reservoir, said restrictor serving to delay the reapplication of the brake on deactivation of the control valve so that the braking pressure does not increase sharply.

2. An hydraulic braking system as claimed in claim 1, wherein said restrictor comprises an orifice in a plate mounted between said third port and said reservoir.

3. A hydraulic braking system as claimed in claim 2, wherein said plate is removably mounted in a passage in said housing in communication with, and of a diameter greater than said third port in said housing, an said plate is clamped between the inner end of a union screwed into said passage and a step in diameter between said passage and said third port.

4. A hydraulic braking system as claimed in claim 2, wherein said plate is interchangeable with a series of similar plates having orifices of different diameters, whereby the characteristics of wheel brake reapplication can be varied.

5. An hydraulic braking system as claimed in claim 1, further comprising a spring-loaded push rod assembly for urging said valve member into engagement with said first seating, and a coupling between said armature and said push rod assembly, wherein said coupling comprises a lost-motion connection so constructed and arranged to permit movement of said armature relative to said push-rod assembly through a limited range at least in a direction towards said first seating, stop means being provided for limiting movement of said push-rod in a direction to urge said valve member into engagement with said first seating, and a fixed abutment being provided to arrest movement of said armature in a direction towards said first seating after said push-rod has engaged with said stop means and before said armature has moved relative to said push-rod through said limited range.

* * * * *